(12) United States Patent
Sasaki

(10) Patent No.: US 12,044,294 B2
(45) Date of Patent: Jul. 23, 2024

(54) SPEED REDUCER

(71) Applicant: NIPPON THOMPSON CO., LTD., Tokyo (JP)

(72) Inventor: Satoshi Sasaki, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 18/287,926

(22) PCT Filed: Mar. 24, 2022

(86) PCT No.: PCT/JP2022/013923
§ 371 (c)(1),
(2) Date: Oct. 23, 2023

(87) PCT Pub. No.: WO2022/249699
PCT Pub. Date: Dec. 1, 2022

(65) Prior Publication Data
US 2024/0191784 A1  Jun. 13, 2024

(30) Foreign Application Priority Data

May 25, 2021  (JP) ................................. 2021-087530

(51) Int. Cl.
*F16H 13/08* (2006.01)
*F16H 57/04* (2010.01)
*F16H 1/32* (2006.01)

(52) U.S. Cl.
CPC ......... *F16H 13/08* (2013.01); *F16H 57/0427* (2013.01); *F16H 57/0486* (2013.01); *F16H 2001/323* (2013.01)

(58) Field of Classification Search
CPC .. F16H 13/08; F16H 57/0427; F16H 57/0486; F16H 2001/323
See application file for complete search history.

(56) References Cited

U.S. PATENT DOCUMENTS

2017/0059029 A1  3/2017  Sasaki

FOREIGN PATENT DOCUMENTS

JP  H08-3733 Y2    1/1996
JP  H083733 Y2 *  1/1996
(Continued)

OTHER PUBLICATIONS

Jun. 14, 2022 Search Report issued in International Patent Application No. PCT/JP2022/013923.

*Primary Examiner* — Justin Holmes
(74) *Attorney, Agent, or Firm* — Oliff PLC

(57) ABSTRACT

A speed reducer includes: ring-shaped external gear including outer teeth, first through hole and multiple second through holes circumferentially surrounding the first; input shaft penetrating the first through hole; first bearing holding the input shaft rotatable to the external gear circumferentially; multiple inner pins penetrating the second through holes axially; inner pin holder surrounding the input shaft outer circumferential surface; second bearing surrounding the external gear outer circumferential surface; and internal tooth pins meshing with outer teeth. The second bearing includes an inner pin holder outer ring, inner ring inside the outer ring radially and output shaft rotating slower than the input shaft, a roller contacting an outer ring inner circumferential surface and an inner ring outer circumferential surface. The inner ring includes a ring shape pin holding portion surrounding the external gear outer circumferential surface, holding the internal tooth pin, and extending along an inner ring inner circumferential surface.

8 Claims, 15 Drawing Sheets

(56) References Cited

FOREIGN PATENT DOCUMENTS

| | | | |
|---|---|---|---|
| JP | 2003-021198 A | 1/2003 | |
| JP | 2006-226370 A | 8/2006 | |
| JP | 4818535 B2 * | 11/2011 | |
| JP | 2013007459 A * | 1/2013 | ............... F16H 1/32 |
| JP | 2017-048852 A | 3/2017 | |
| JP | 2017-067276 A | 4/2017 | |
| JP | 2017-110776 A | 6/2017 | |
| JP | 2020024009 A * | 2/2020 | |
| JP | 2020-133904 A | 8/2020 | |

* cited by examiner

SPEED REDUCER

TECHNICAL FIELD

The present disclosure relates to a speed reducer. This application claims priority to Japanese Patent Application No. 2021-087530, which was filed on May 25, 2021, and is incorporated herein by reference in its entirety.

BACKGROUND ART

Speed reducers have been used to date for control units for driving wheels in mobile devices, robots, and machine tools. Patent Literature 1, for example, describes a technique of this type.

A speed reducer described in Patent Literature 1 includes an input shaft including a pair of eccentric portions, a pair of cycloid gears to be in contact with the pair of eccentric portions, a hub serving as an output shaft, an output shaft pin holder, a plurality of outer pins, an outer pin holder holding the outer pins, and an inner pin supported by the hub. The hub is supported by the outer pin holder through a cross roller bearing. The cross roller bearing includes an outer ring fixed to the outer pin holder, an inner ring fixed to the hub, and a plurality of rollers between the outer ring and the inner ring.

CITATION LIST

Patent Literature

Patent Literature 1: Japanese Patent Application Laid-Open No. 2017-48852

SUMMARY OF INVENTION

Technical Problem

In the speed reducer described in Patent Literature 1, the outer pin holder and the inner ring of the cross roller bearing are arranged in the axial direction. Thus, in the speed reducer, the thickness in the axial direction is large, and thus, there is room for improvement in compacting.

It is therefore an object of the present disclosure to provide a speed reducer that can be made compact in an axial direction.

Solution to Problems

A speed reducer according to the present disclosure includes: a ring-shaped external gear including a plurality of outer teeth and having a first through hole and a plurality of second through holes, the outer teeth being arranged on an outer circumferential surface of the external gear along circumferential directions, the first through hole penetrating the external gear in axial directions, the second through holes being arranged in the circumferential directions to surround the first through hole; an input shaft penetrating the first through hole and rotatable about a rotation axis; a first bearing disposed between the external gear and the input shaft and holding the input shaft such that the input shaft is rotatable relative to the external gear in the circumferential directions; a plurality of inner pins penetrating the second through holes in the axial directions; an inner pin holder holding both ends of the inner pins and surrounding an outer circumferential surface of the input shaft; a second bearing surrounding the outer circumferential surface of the external gear; and internal tooth pins meshing with the outer teeth. The second bearing includes an outer ring fixed to the inner pin holder, an inner ring disposed inward of the outer ring in radial directions and constituting an output shaft that rotates at a speed lower than the input shaft, and a roller that contacts an inner circumferential surface of the outer ring and an outer circumferential surface of the inner ring. The inner ring includes a pin holding portion having a ring shape surrounding the outer circumferential surface of the external gear, the pin holding portion holding the internal tooth pin and extending along an inner circumferential surface of the inner ring.

Advantages of Invention

The present disclosure can provide a speed reducer that can be made compact in an axial direction.

DESCRIPTION OF EMBODIMENTS

Summary of Embodiment

Figure 1:
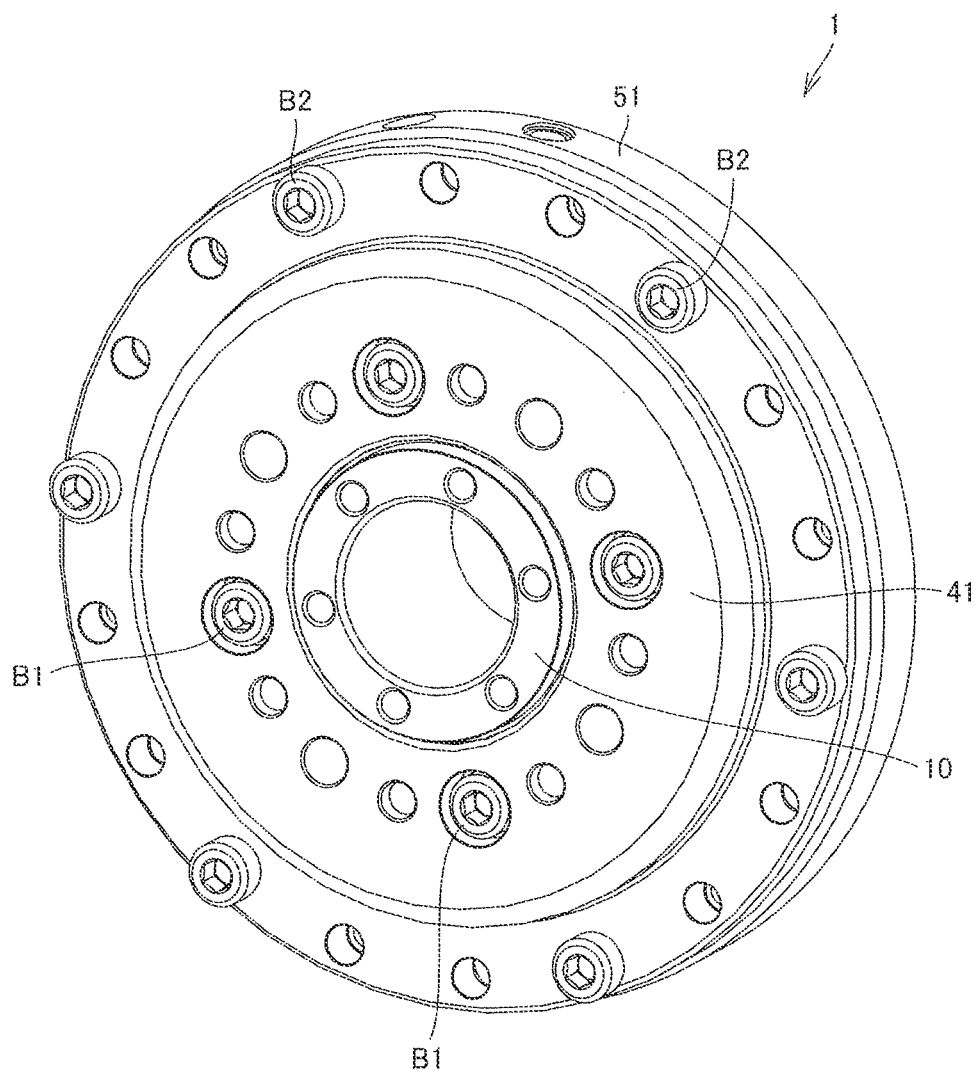
FIG. 1 is a perspective view illustrating an exterior configuration of a cycloid speed reducer according to a first embodiment.

A speed reducer according to the present disclosure includes: a ring-shaped external gear including a plurality of outer teeth and having a first through hole and a plurality of second through holes, the outer teeth being arranged on an outer circumferential surface of the external gear along circumferential directions, the first through hole penetrating the external gear in axial directions, the second through holes being arranged in the circumferential directions to surround the first through hole; an input shaft penetrating the first through hole and rotatable about a rotation axis; a first bearing disposed between the external gear and the input shaft and holding the input shaft such that the input shaft is rotatable relative to the external gear in the circumferential directions; a plurality of inner pins penetrating the second through holes in the axial directions; an inner pin holder holding both ends of the inner pins and surrounding an outer circumferential surface of the input shaft; a second bearing surrounding the outer circumferential surface of the external gear; and internal tooth pins meshing with the outer teeth. The second bearing includes an outer ring fixed to the inner pin holder, an inner ring disposed inward of the outer ring in radial directions and constituting an output shaft that rotates at a speed lower than the input shaft, and a roller that contacts an inner circumferential surface of the outer ring and an outer circumferential surface of the inner ring. The inner ring includes a pin holding portion having a ring shape surrounding the outer circumferential surface of the external gear, the pin holding portion holding the internal tooth pin and extending along an inner circumferential surface of the inner ring.

In the speed reducer, the internal tooth pins are held at the inner circumferential surface of the inner ring constituting the output shaft. That is, the inner ring serves as a holder of the internal tooth pins. Thus, the thickness in the axial direction can be reduced as compared to a conventional speed reducer in which an inner ring and a holder of internal tooth pins (outer pin holder) are arranged in an axial direction as separate members. As a result, the speed reducer according to the present disclosure can be made more compact in the axial direction than conventional speed reducers.

In the speed reducer, the inner ring may have an oil supply hole penetrating the inner ring in the radial directions. This configuration can guide lubricating oil supplied between the outer ring and the inner ring of the second bearing to a region radially inward of the inner ring through the oil supply hole. Accordingly, the internal tooth pins held at the inner circumferential surface of the inner ring can be easily lubricated.

In the speed reducer, the outer circumferential surface of the inner ring may have a groove such that a distance between raceway surfaces gradually increases in a direction away from a bottom of the groove in a cross section including the rotation axis. The oil supply hole may be disposed at the bottom of the groove. This configuration allows lubricating oil supplied between the outer ring and the inner ring of the second bearing to easily flow into the oil supply hole along the raceway surfaces with rolling of the roller.

In the speed reducer, the inner pin holder may include a first holder portion including a ring-shaped holding portion that holds first ends of the inner pins, a second holder portion including a ring-shaped holding portion that holds second ends of the inner pins at a side opposite to the first ends, and columns connecting the first holder portion and the second holder portion to each other, being arranged at intervals in the circumferential directions, and penetrating the second through holes. The speed reducer may further include a fixing member that fixes end surfaces of the columns to the first holder portion or the second holder portion and is inserted in the columns from the end surfaces. This configuration eliminates the necessity for inserting the fixing member into the inner pin, and thus, the inner pin can be made thin.

In the speed reducer, a cross-sectional shape perpendicular to a longitudinal direction of each of the columns may be an arc shape extending in the circumferential directions. The second through holes may be elongated holes each extending in the circumferential directions. In this configuration, since the area of an end surface of the column further increases, and thus, the position at which the fixing member is inserted is less restricted. Accordingly, flexibility in design of the speed reducer can be enhanced.

In the speed reducer, each two of the inner pins may sandwich a corresponding one of the columns in the circumferential directions. The inner pins may be rolling bearings or plain bearings. In this configuration, the inner pins serving as rolling bearings or plain bearings rotate by contact with the inner surface of the second through hole, and thus, an increase in a rotation torque of the input shaft in driving of the speed reducer can be suppressed.

The speed reducer may further include a lubricating member disposed inward of the second through holes and contacting the inner pins. In this configuration, the inner pins are lubricated, and thus, friction between the outer circumferential surfaces of the inner pins and the inner surfaces of the second through holes of the external gear can be reduced. This can reduce a loss caused by friction between the inner pins and the second through holes so that an increase in rotation torque of the input shaft in driving the speed reducer can be suppressed.

In the speed reducer, the lubricating member may include a hole penetrating the lubricating member in the axial directions. This configuration achieves further weight reduction, as compared to a case where the lubricating member is a solid member.

Specific Examples of Embodiment

Next, an embodiment of a speed reducer according to the present disclosure will be described with reference to the drawings. In the following drawings, the same or corresponding parts are denoted by the same reference numerals, and the description thereof will not be repeated.

First Embodiment

Figure 2:
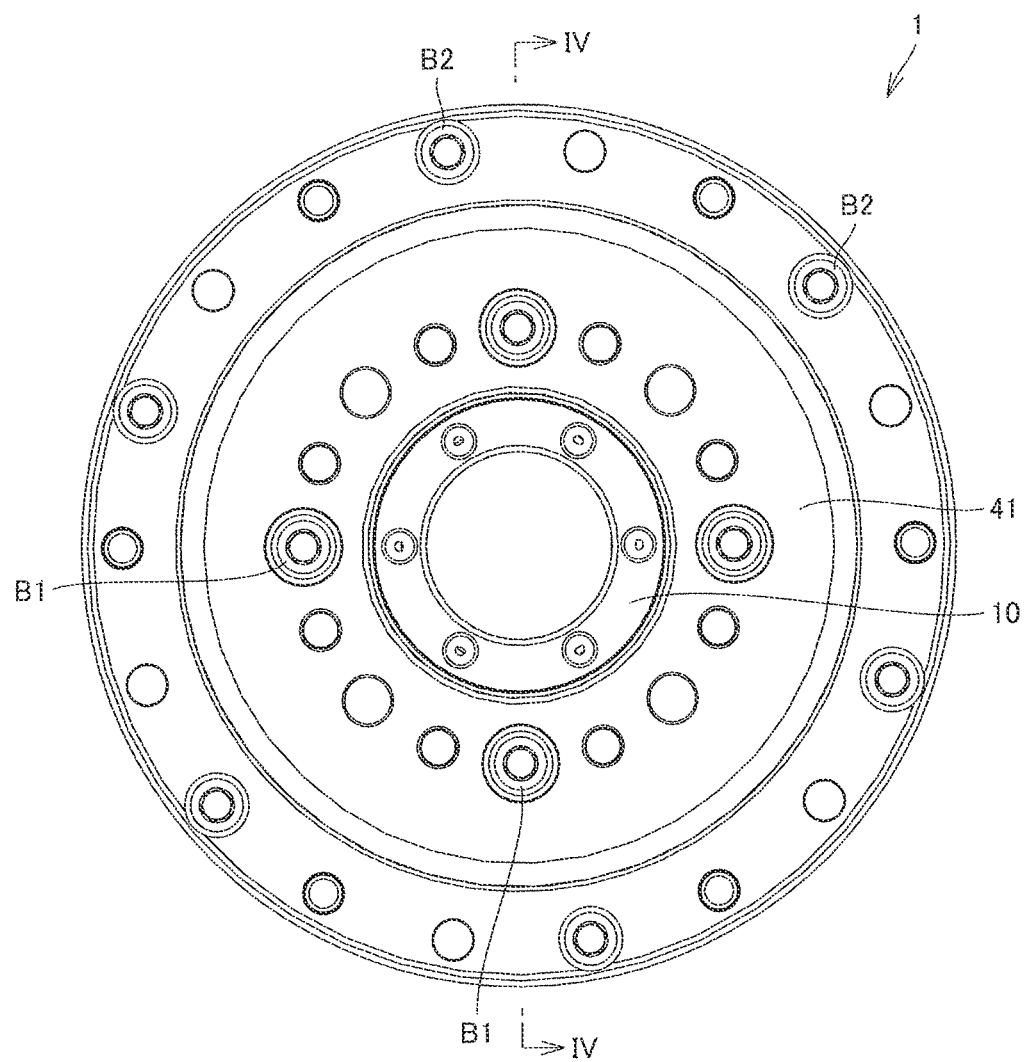
FIG. 2 is a front view of the cycloid speed reducer according to the first embodiment seen from a first holder portion.
Figure 3:
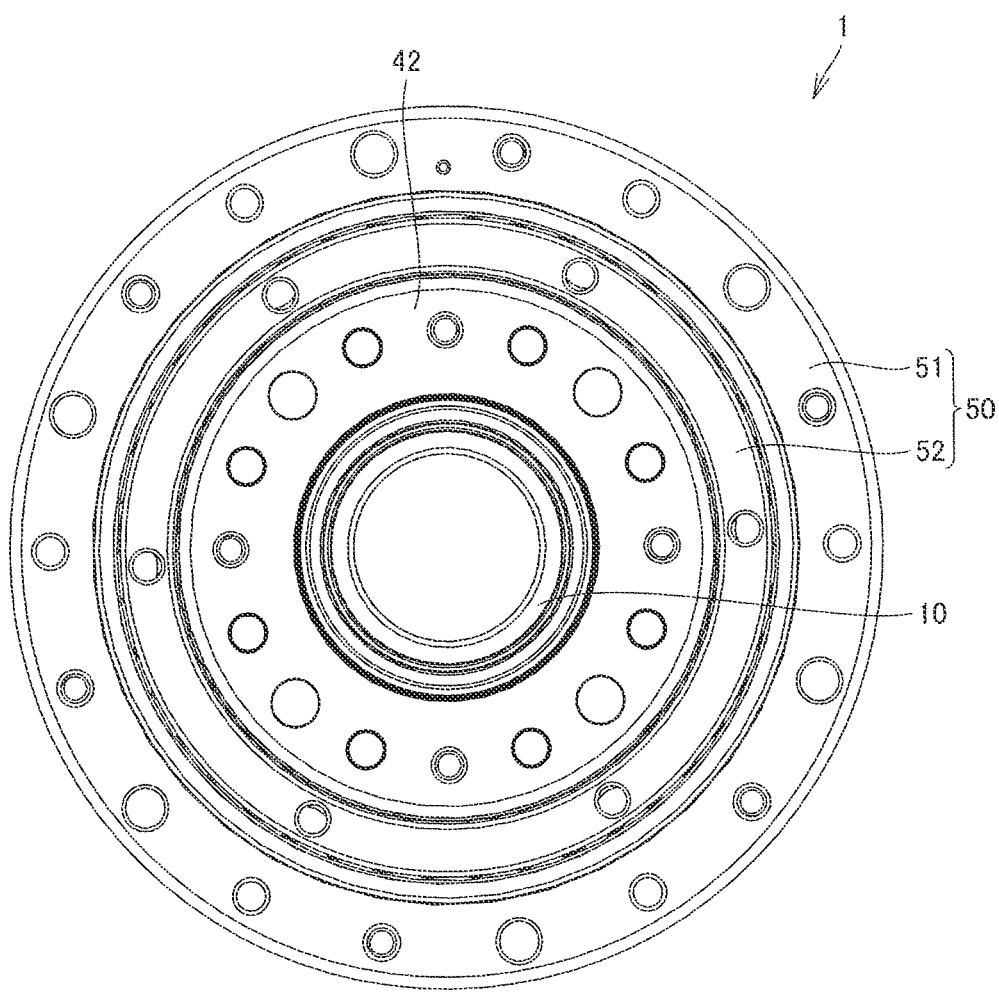
FIG. 3 is a rear view of the cycloid speed reducer according to the first embodiment seen from an output shaft.
Figure 4:
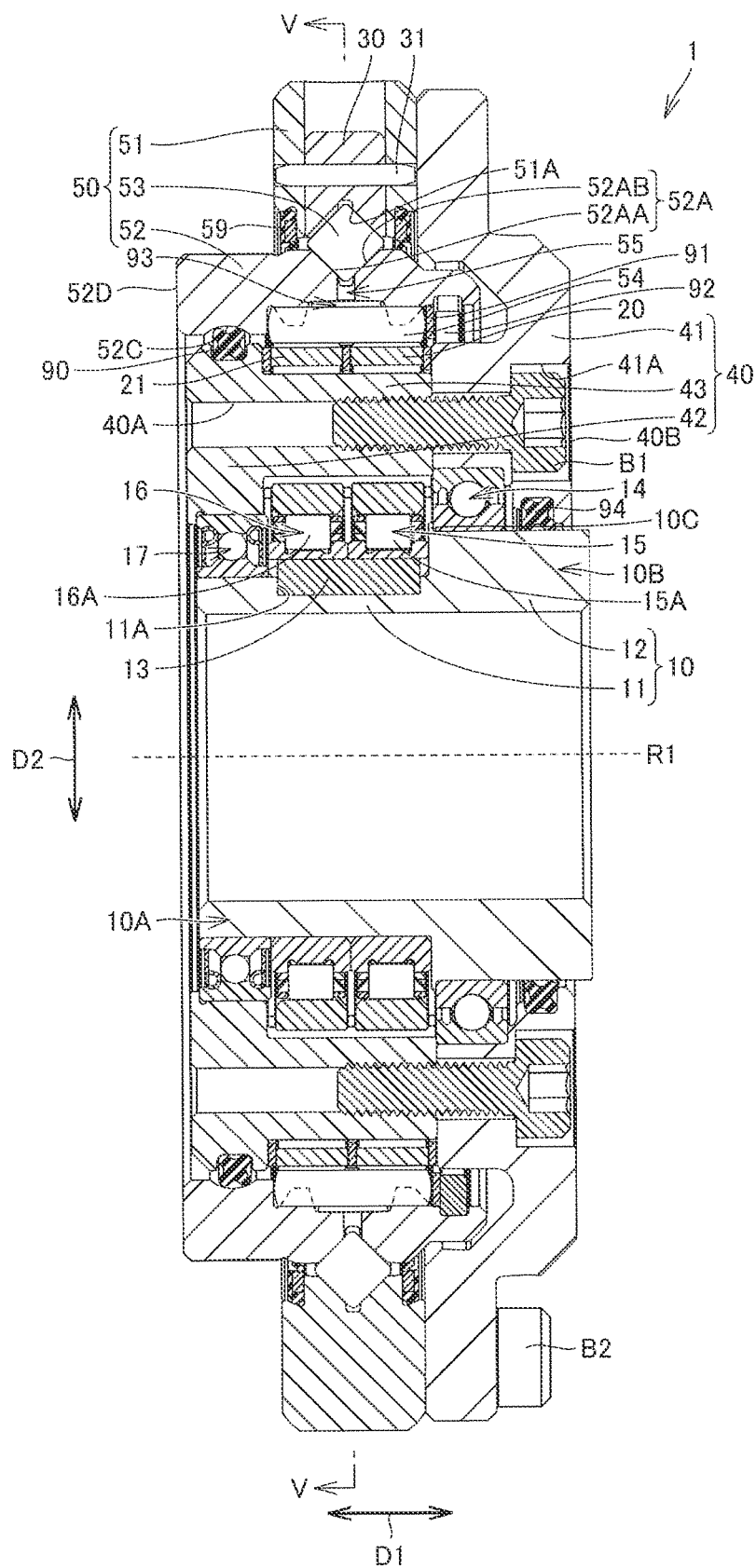
FIG. 4 is a cross-sectional view taken along line IV-IV in FIG. 2.
Figure 5:
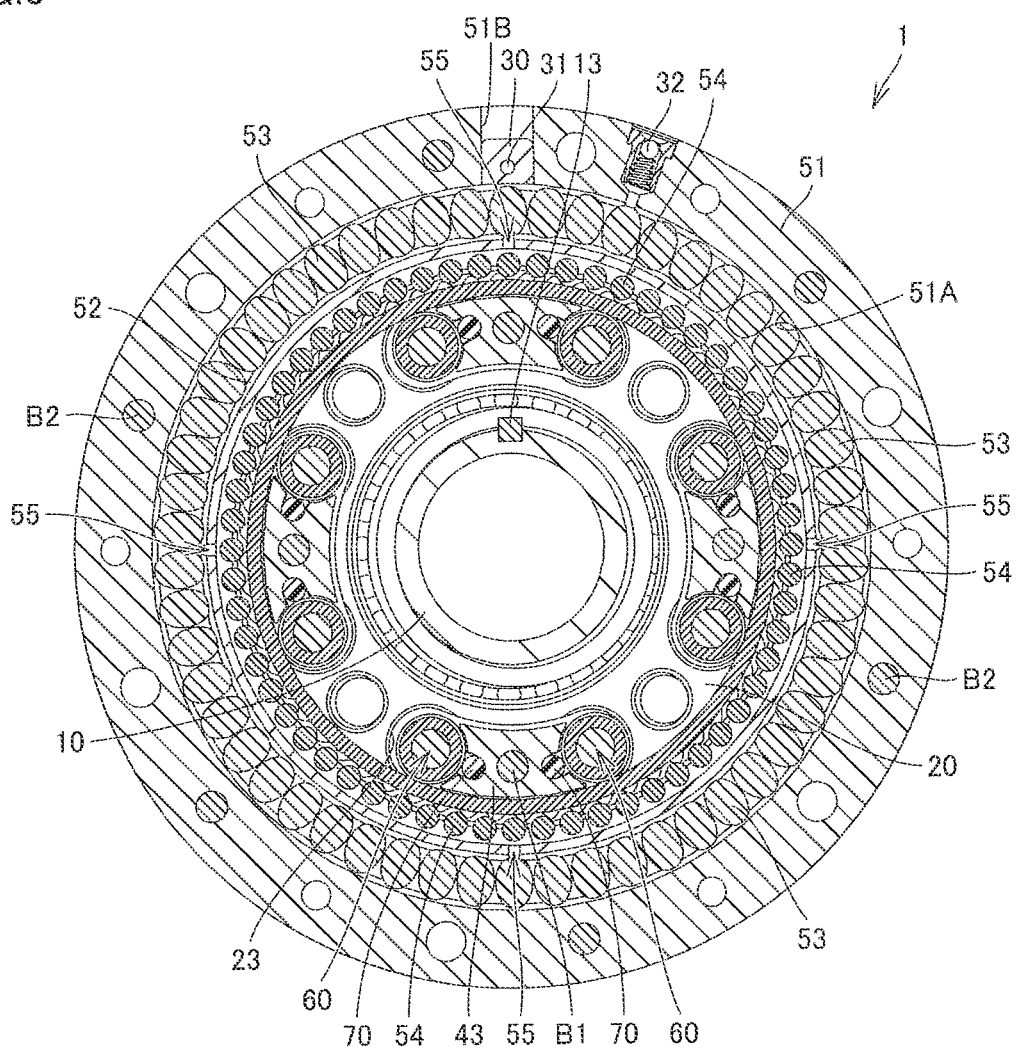
FIG. 5 is a cross-sectional view taken along line V-V in FIG. 4.

First, a configuration of a cycloid speed reducer 1 (hereinafter referred to simply as a "speed reducer 1") according to a first embodiment will be described. The speed reducer 1 is used for, for example, a joint of a robot or a control unit for driving a wheel in a mobile device. FIG. 1 is a perspective view illustrating an exterior configuration of the speed reducer 1. FIG. 2 is a front view of the speed reducer 1 seen from a first holder portion 41. FIG. 3 is a rear view of the speed reducer 1 seen from an output shaft. FIG. 4 is a cross-sectional view taken along line IV-IV in FIG. 2. FIG. 5 is a cross-sectional view taken along line V-V in FIG. 4. As illustrated in FIG. 4, the speed reducer 1 includes an input shaft 10, first and second external gears 20 and 21 (external gears), a first eccentric bearing 15 (first bearing), a second eccentric bearing 16 (first bearing), an inner pin holder 40, a second bearing 50, and internal tooth pins 54. These components will be hereinafter individually described in detail.

The input shaft 10 has a hollow cylindrical shape and is rotatable about a rotation axis R1. As illustrated in FIG. 4, the input shaft 10 includes a first end 10A, and a second end 10B located at the opposite side to the first end 10A in axial directions D1. The second end 10B is an end at the opposite side to the output shaft, and projects outward in the axial directions D1 from an end surface 40B of the inner pin holder 40. A driving motor (not shown) is attached to the second end 10B, and the input shaft 10 rotates about the rotation axis R1 at a predetermined rotation speed by driving the motor. The input shaft is not limited to a hollow shaft and may be a solid shaft.

The input shaft 10 includes a first shaft portion 11 including the first end 10A. and a second shaft portion 12 including the second end 10B. As illustrated in FIG. 4, the outer diameter of the second shaft portion 12 is larger than the outer diameter of the first shaft portion 11. On the other hand, the inner diameter of the first shaft portion 11 is substantially equal to the inner diameter of the second shaft portion 12.

The second shaft portion 12 is inserted in an inner ring of a first support bearing 14. As illustrated in FIG. 4, a portion of an outer circumferential surface of the second shaft portion 12 adjacent to the first shaft portion 11 includes an annular shoulder 10C projecting outward in radial directions D2. The shoulder 10C restricts movement of the inner ring of the first support bearing 14 toward the output shaft (leftward in FIG. 4). The first shaft portion 11 is inserted in inner rings of a first eccentric bearing 15, a second eccentric bearing 16, and a second support bearing 17. Both ends of the input shaft 10 are supported by the first support bearing 14 and the second support bearing 17. The first eccentric bearing 15 is disposed between the first external gear 20 and the input shaft 10 (first shaft portion 11), and holds the input shaft 10 such that the input shaft 10 is rotatable circumferentially relative to the first external gear 20. The second eccentric bearing 16 is disposed between the second external gear 21 and the input shaft 10 (first shaft portion 11), and holds the input shaft 10 such that the input shaft 10 is rotatable circumferentially relative to the second external gear 21. As illustrated in FIG. 4, a keyway 11A in which a key 13 is to be inserted is formed on an outer circumferential surface of the first shaft portion 11 and extends in the axial directions D1. The key 13 fixes the inner rings of the first eccentric bearing 15 and the second eccentric bearing 16 to the outer circumferential surface of the input shaft 10 (first shaft portion 11).

The first support bearing 14 and the second support bearing 17 are, for example, deep groove ball bearings. In this embodiment, since an end surface of the first support bearing 14 in the axial directions D1 is covered with the inner pin holder 40, although the first support bearing 14 is not provided with a seal, the presence or absence of the seal is not particularly limited. On other hand, although the second support bearing 17 is provided with a seal, this seal may be omitted.

Figure 6:
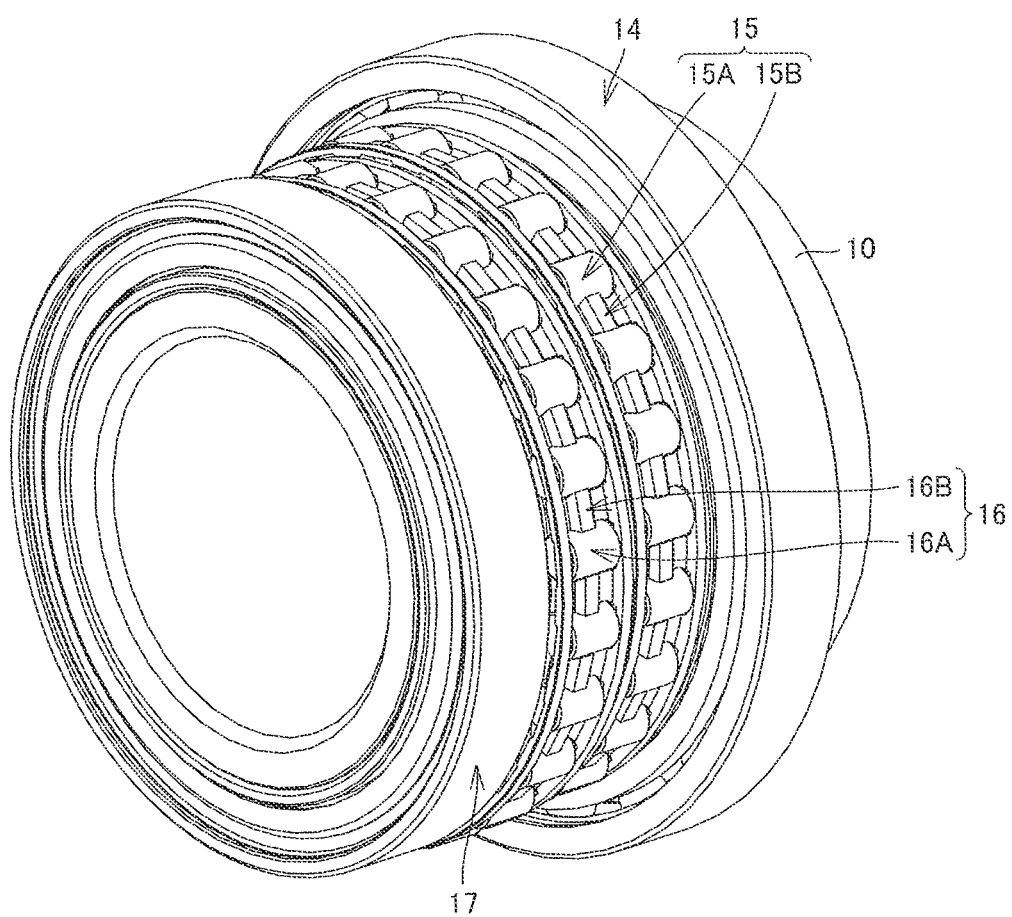
FIG. 6 is a perspective view illustrating a configuration of an input shaft.

The first eccentric bearing 15 and the second eccentric bearing 16 are, for example, cylindrical roller bearings. Each of the first eccentric bearing 15 and the second eccentric bearing 16 is fixed to the input shaft 10 with an eccentric phase shifted by 180°. FIG. 6 is a perspective view illustrating the input shaft 10 inserted in the first support bearing 14, the first eccentric bearing 15, the second eccentric bearing 16, and the second support bearing 17. The first eccentric bearing 15 includes a resin cage 15B in addition to the inner ring, an outer ring, and a roller 15A (cylindrical roller) that are eccentric to the center of the input shaft 10 (rotation axis R1). Similarly, the second eccentric bearing 16 includes a resin cage 16B in addition to the inner ring, an outer ring, and a roller 16A (cylindrical roller) that are eccentric to the input shaft 10. As illustrated in FIG. 4, the inner ring of the first eccentric bearing 15 includes a pair of flanges that restricts movement of the roller 15A in the axial directions D1, and the inner ring of the second eccentric bearing 16 includes a pair of flanges that restricts movement of the roller 16A in the axial directions D1. Materials for the cages 15B and 16B are not particularly limited.

The first external gear 20 and the second external gear 21 are cycloid gears. The first external gear 20 is fitted onto the outer ring of the first eccentric bearing 15 from the outer side in the radial directions D2. The second external gear 21 is fitted onto the outer ring of the second eccentric bearing 16 from the outer side in the radial directions D2.

Figure 7:
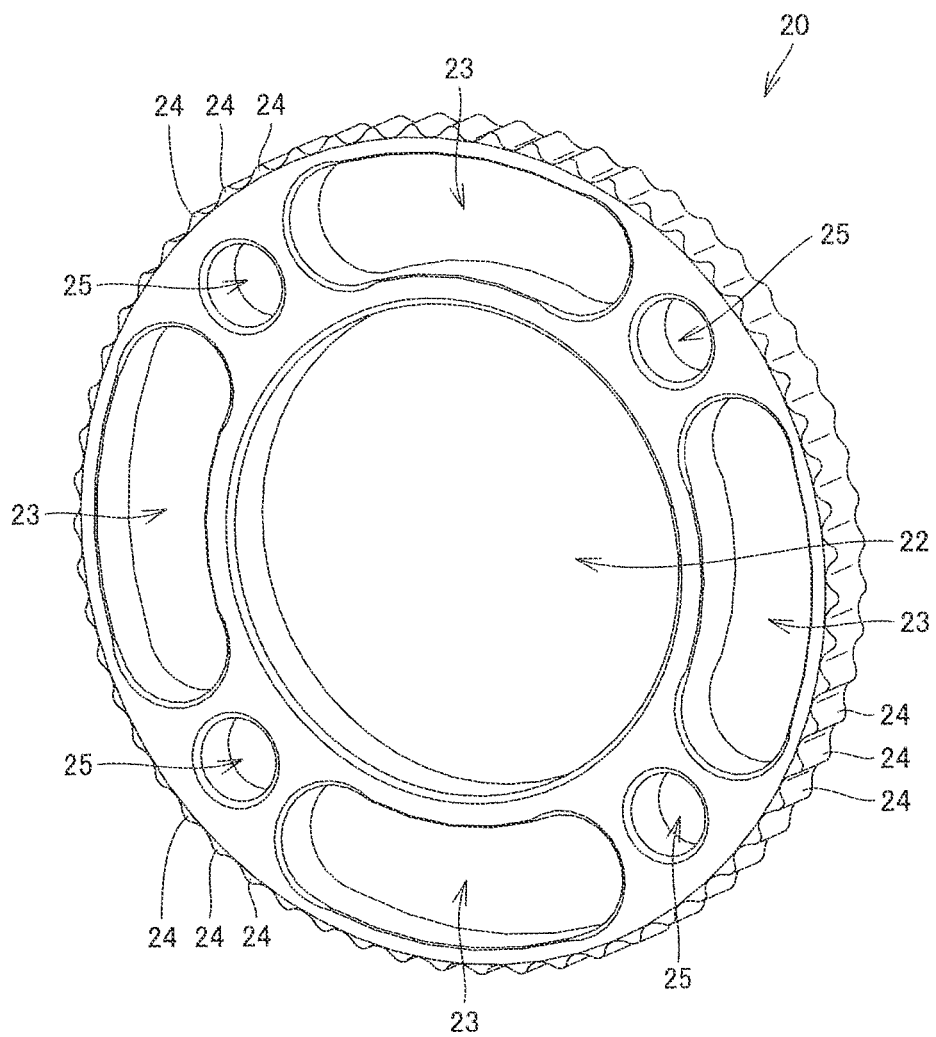
FIG. 7 is a perspective view illustrating a configuration of a cycloid gear.

FIG. 7 is a perspective view of the first external gear 20. As illustrated in FIG. 7, the first external gear 20 is a ring-shaped member including a plurality of outer teeth 24 arranged on the outer circumferential surface circumferentially and having a first through hole 22 and a plurality of second through holes 23 penetrating the first external gear 20 in the axial directions D1. The first through hole 22 is a circular hole including the center of the first external gear 20, and the outer ring of the first eccentric bearing 15 (FIG. 4) is fitted in the first through hole 22, and the input shaft 10 (FIG. 4) penetrates the first through hole 22. The second through holes 23 are arc-shaped elongated holes each extending circumferentially, and are arranged circumferentially to surround the first through hole 22. The first external gear 20 also includes a plurality of (four in this embodiment) third through holes 25 for weight reduction and screw attachment. The third through holes 25 are circular holes and each sandwiched between a pair of second through holes 23 in the circumferential directions. A power cord or the like may pass through at least one of the third through holes 25. The outer teeth 24 have, but not limited to, an epitrochoid parallel curve. The number of the outer teeth 24 is not particularly limited, and can be selected as needed in order to obtain a desired deceleration rate.

The first external gear 20 is made of, but not limited to, a steel member such as high-carbon chromium bearing steel (SUJ2) or chromium molybdenum steel (SCM) in conformity with Japanese Industrial Standards (JIS) and subjected to heat treatment, for example. To reduce the weight of the first external gear 20, aluminum or a resin material such as carbon fiber reinforced plastic (CFRP) may be employed as a material for the first external gear 20. The second external gear 21 is basically the same as the first external gear 20, and thus, will not be described in detail. The outer ring of the second eccentric bearing 16 (FIG. 4) is fitted in the first through hole 22 of the second external gear 21, and the input shaft 10 (FIG. 4) penetrates the first through hole 22.

Figure 8:
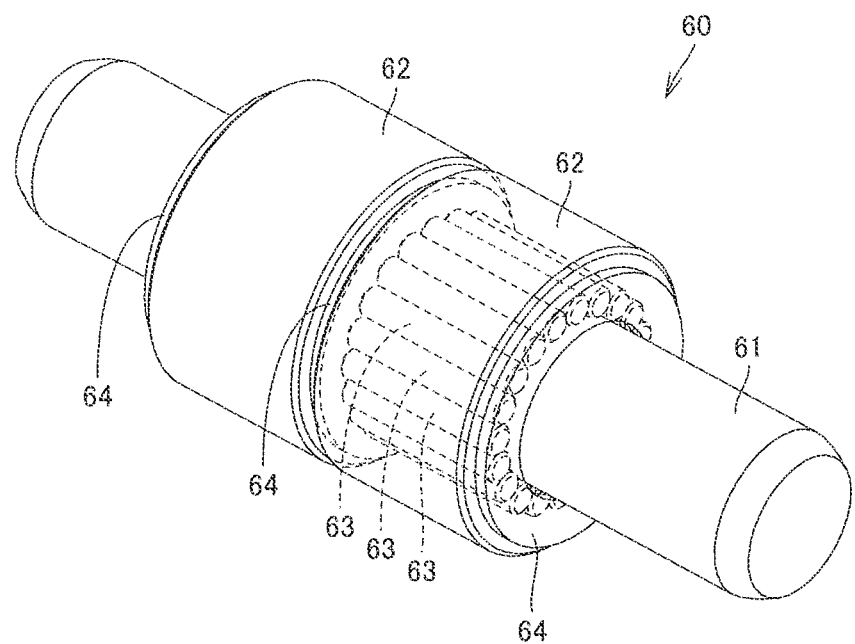
FIG. 8 is a perspective view illustrating a configuration of inner pins.

The speed reducer 1 includes a plurality of (eight in this embodiment) inner pins 60 penetrating the second through holes 23 in the first external gear 20 and the second external gear 21 along the axial directions D1 (FIG. 5). FIG. 8 is a perspective view illustrating a configuration of the inner pins 60 in this embodiment, and shows rollers 63 by broken lines. As illustrated in FIG. 8, each of the inner pins 60 is a rolling bearing including a columnar shaft 61, a pair of ring-shaped outer rings 62 whose inner diameter is larger than the outer diameter of the shaft 61, and a plurality of rollers 63 (needle rollers). The inner pin is not limited to the rolling bearing, and may be, for example, a plain bearing.

As illustrated in FIG. 8, the shaft 61 has its corners at both ends chamfered and is inserted in the inside of the outer rings 62. The rollers 63 are disposed in a ring shape between the outer circumferential surface of the shaft 61 and the inner circumferential surfaces of the outer rings 62. Each inner pin 60 includes thrust washers 64 located at outer end surfaces of the outer rings 62 and between the outer rings 62. The thrust washers 64 are made of, but not limited to, a thermoplastic resin such as polyether ether ketone (PEEK).

The inner pin holder 40 (FIG. 4) holds both ends of the inner pins 60 and surround the outer circumferential surface of the input shaft 10. As illustrated in FIG. 4, the inner pin holder 40 includes the first holder portion 41, a second holder portion 42. and columns 43. An annular seal 94 is disposed between the inner circumferential surface of the first holder portion 41 and the outer circumferential surface of the input shaft 10 (second shaft portion 12). The seal 94 is made of, for example, rubber and disposed for dustproof and prevention of leakage of a lubricant. A lip of the seal 94 contacts the outer circumferential surface of the input shaft 10 (second shaft portion 12). Thrust washers are disposed between the first external gear 20 and the first holder portion 41, between the first external gear 20 and the second external gear 21, and between the second external gear 21 and the second holder portion 42. The thrust washers are made of, for example, a thermoplastic resin such as PEEK. Accordingly, abrasion caused by contact between the external gear and the inner pin holder 40 and abrasion caused by contact between the external gears are suppressed, and heat generation can be prevented. The thrust washers and the seal 94 are not necessary elements for the speed reducer according to the present disclosure, and may be omitted.

Figure 9:
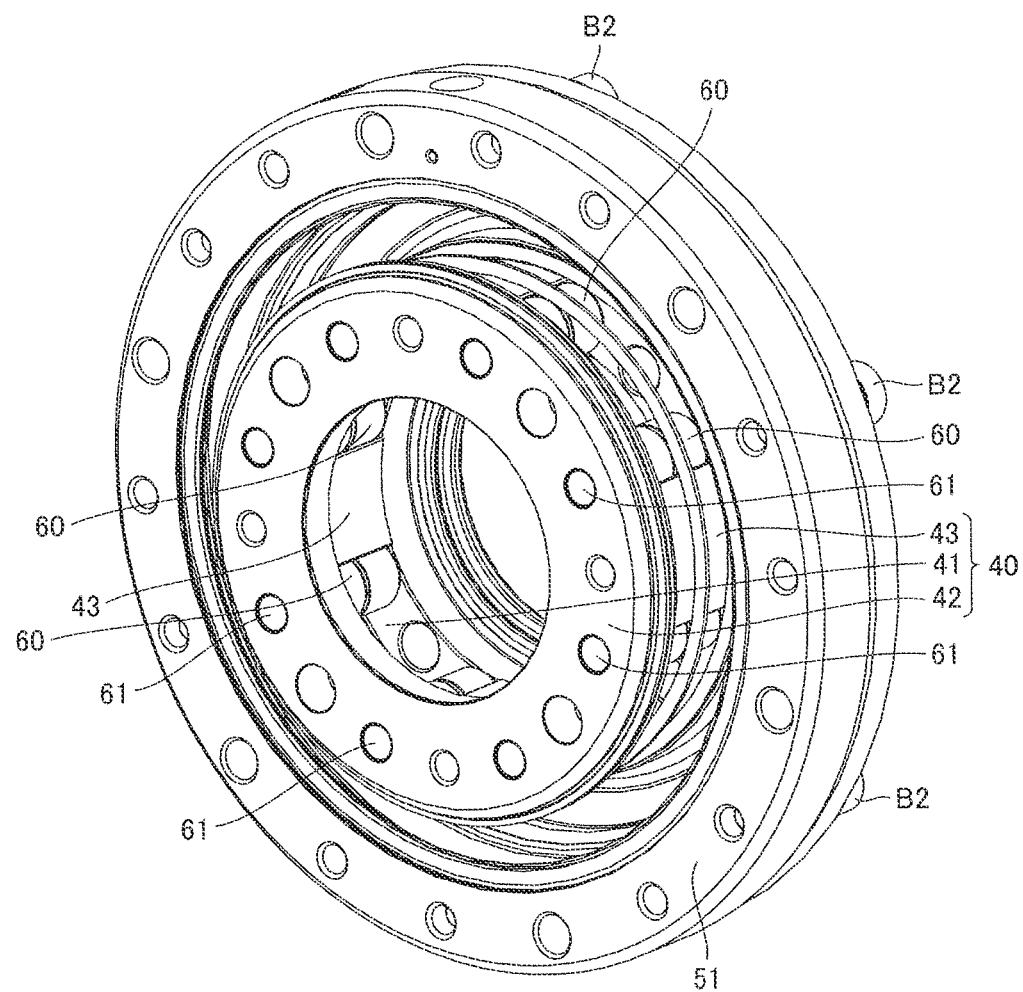
FIG. 9 is a perspective view illustrating a configuration of a fixed shaft of the cycloid speed reducer according to the first embodiment.

FIG. 9 is a perspective view illustrating a configuration in which both ends of the inner pins 60 are held by the inner pin holder 40. FIG. 9 does not show the input shaft 10, the first external gear 20, and the second external gear 21. The first holder portion 41 and the second holder portion 42 have flat ring shapes and are opposed to each other in the axial directions D1. The first holder portion 41 includes a ring-shaped holding portion that holds first ends of the inner pins 60. The second holder portion 42 includes a ring-shaped holding portion that holds second ends of the inner pins 60 opposite to the first ends. More specifically, each of the first holder portion 41 and the second holder portion 42 has a plurality of holes in which ends of the shafts 61 of the inner pins 60 are press fitted and which are arranged at intervals circumferentially.

Figure 10:
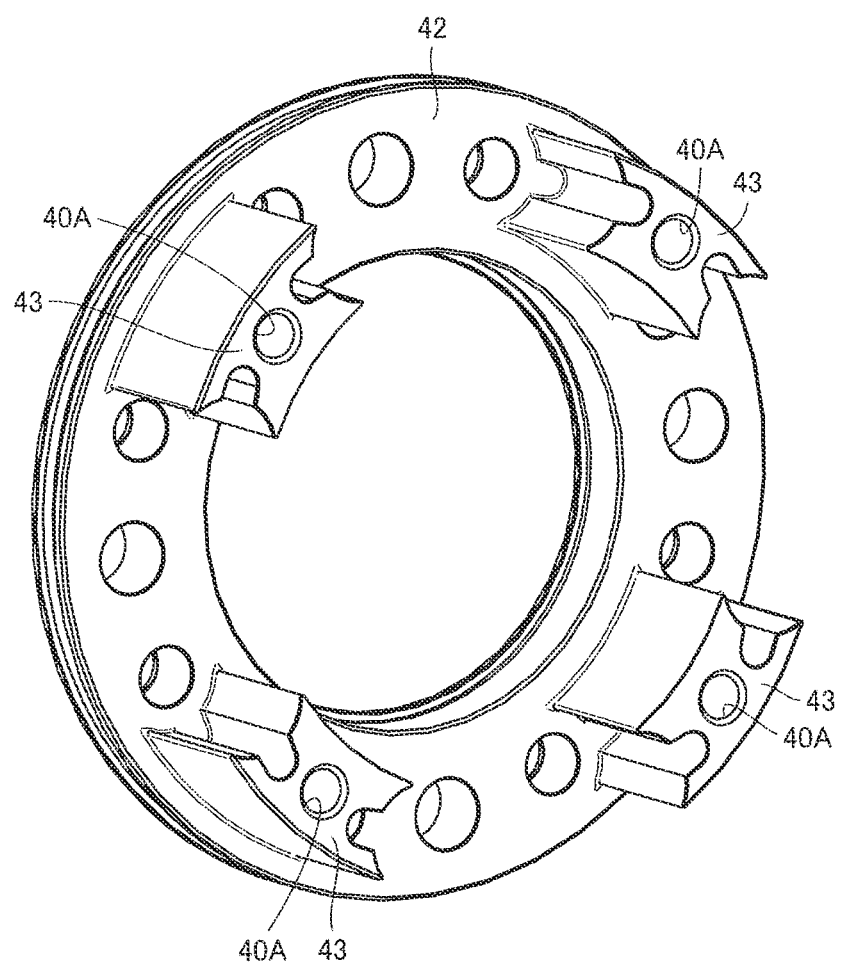
FIG. 10 is a perspective view of a configuration of a second holder portion and a column.

The columns 43 connect the first holder portion 41 and the second holder portion 42 to each other. FIG. 10 illustrates a state where the first holder portion 41 is detached from the inner pin holder 40. In this embodiment, the second holder portion 42 and the columns 43 are integrated. As illustrated in FIG. 10, the plurality of (four) columns 43 are arranged at intervals circumferentially and extend in the axial directions D1. As illustrated in FIG. 5, the columns 43 penetrate the second through holes 23 in the first external gear 20 and the second external gear 21, together with the inner pins 60.

As illustrated in FIG. 4, the speed reducer 1 includes a plurality of bolts B1 (fixing members) for fixing end surfaces (surfaces opposite to the second holder portion 42) of the columns 43 to the first holder portion 41. The bolts B1 are inserted in the columns 43 from the end surfaces of the columns 43 along the axial directions D1. The first holder portion 41 has bolt holes 41A in which the bolts B1 are inserted. The second holder portion 42 and the columns 43 have internal screw holes 40A with which external screws on the outer circumferential surfaces of shaft portions of the bolts B1 mesh. Both the bolt holes 41A and the internal screw holes 40A are through holes and extend in the axial directions D1. As illustrated in FIG. 4, the first support bearing 14 is disposed between the outer circumferential surface of the input shaft 10 (second shaft portion 12) and the inner circumferential surface of the first holder portion 41. The second support bearing 17 is disposed between the outer circumferential surface of the input shaft 10 (first shaft portion 11) and the inner circumferential surface of the second holder portion 42. The outer diameter of the first holder portion 41 is larger than the outer diameter of the second holder portion 42.

As illustrated in FIG. 5, a cross-sectional shape perpendicular to the longitudinal direction of the columns 43 (direction coming out of the drawing plane of FIG. 5) is an arc shape extending circumferentially. The inner pins 60 are arranged to sandwich the columns 43 from both sides thereof circumferentially. That is, a pair of inner pints 60 sandwiching one column 43 and one column 43 is inserted in one second through hole 23. In this embodiment, four columns 43 are provided, and eight inner pins 60, which is a double of the number of the columns 43, are provided. However, these numbers are not particularly limited. It should be noted that the number of the columns 43 is preferably three or more. As illustrated in FIG. 5, the inner pins 60 can contact the second through holes 23 at one point on the inner surfaces thereof in the circumferential directions.

The speed reducer 1 is disposed at the inner side of the second through holes 23 and includes inner pin lubricating members 70 in contact with the inner pins 60. As illustrated in FIG. 5, grooves that are recessed in a direction away from the inner pins 60 are formed at both sides of each of the columns 43 in the circumferential directions, and the inner pin lubricating members 70 are disposed in the grooves. The inner pin lubricating members 70 are formed by, for example, impregnating porous sintered resin members with a lubricant, and each have a solid cylindrical shape extending in the axial directions D1 (direction going into the drawing plane of FIG. 5). In the speed reducer according to the present disclosure, the inner pin lubricating members 70 are not necessary elements and may be omitted.

As illustrated in FIG. 4, the second bearing 50 surrounds the outer circumferential surfaces of the first external gear 20 and the second external gear 21. The second bearing 50 in this embodiment is a cloth roller bearing, and includes an outer ring 51, an inner ring 52 disposed inward of the outer ring 51 in the radial directions D2, a plurality of rollers 53 in contact with the inner circumferential surface 51A of the outer ring 51 and an outer circumferential surface 52A of the inner ring 52, and an annular seal 59. Each of the outer ring 51 and the inner ring 52 is made of, but not limited to, a metal material on which a heat treatment (e.g., quenching and tempering) can be performed, such as high-carbon chromium bearing steel in conformity with JIS. The second bearing 50 may further include a cage and a separator, for example.

As illustrated in FIG. 1, the outer ring 51 has a diameter substantially equal to that of the first holder portion 41 and is fixed to an outer peripheral portion of the first holder portion 41 with a plurality of (six in this embodiment) bolts B2. The outer ring 51 constitutes a fixed shaft together with the inner pin holder 40. As illustrated in FIG. 5, the outer ring 51 has an insertion hole 51B for the rollers 53 such that the insertion hole 51B penetrates the outer ring 51B in the radial directions. The insertion hole 51B is covered with a lid member 30, and the lid member 30 is retained at the insertion hole 51B with a pin 31. As illustrated in FIG. 5, a grease nipple 32 is disposed in the outer ring 51 such that a lubricant such as grease can be supplied to the inside of the outer ring 51.

The inner ring 52 constitutes the output shaft of the speed reducer 1 and rotates about the rotation axis R1 at a speed lower than the input shaft 10. A counterpart member (not shown) is attached to an outer end surface 52D (FIG. 4) of the inner ring 52. As illustrated in FIG. 4, the inner ring 52 has a thickness larger than the outer ring 51 in the axial directions D1, and projects outward of the outer ring 51 in the axial directions D1. The inner ring 52 has a ring shape surrounding the outer circumferential surfaces of the first external gear 20 and the second external gear 21. An annular seal 90 is disposed between the inner circumferential surface of the inner ring 52 and the outer circumferential surface of the second holder portion 42 of the inner pin holder 40. The seal 90 has the same shape as that of the seal 94. A lip of the seal 90 is to contact an annular recessed groove 52C formed on the inner circumferential surface of the inner ring 52 and located outward of the holding portions of the internal tooth pins 54 in the axial directions D1.

Figure 11:
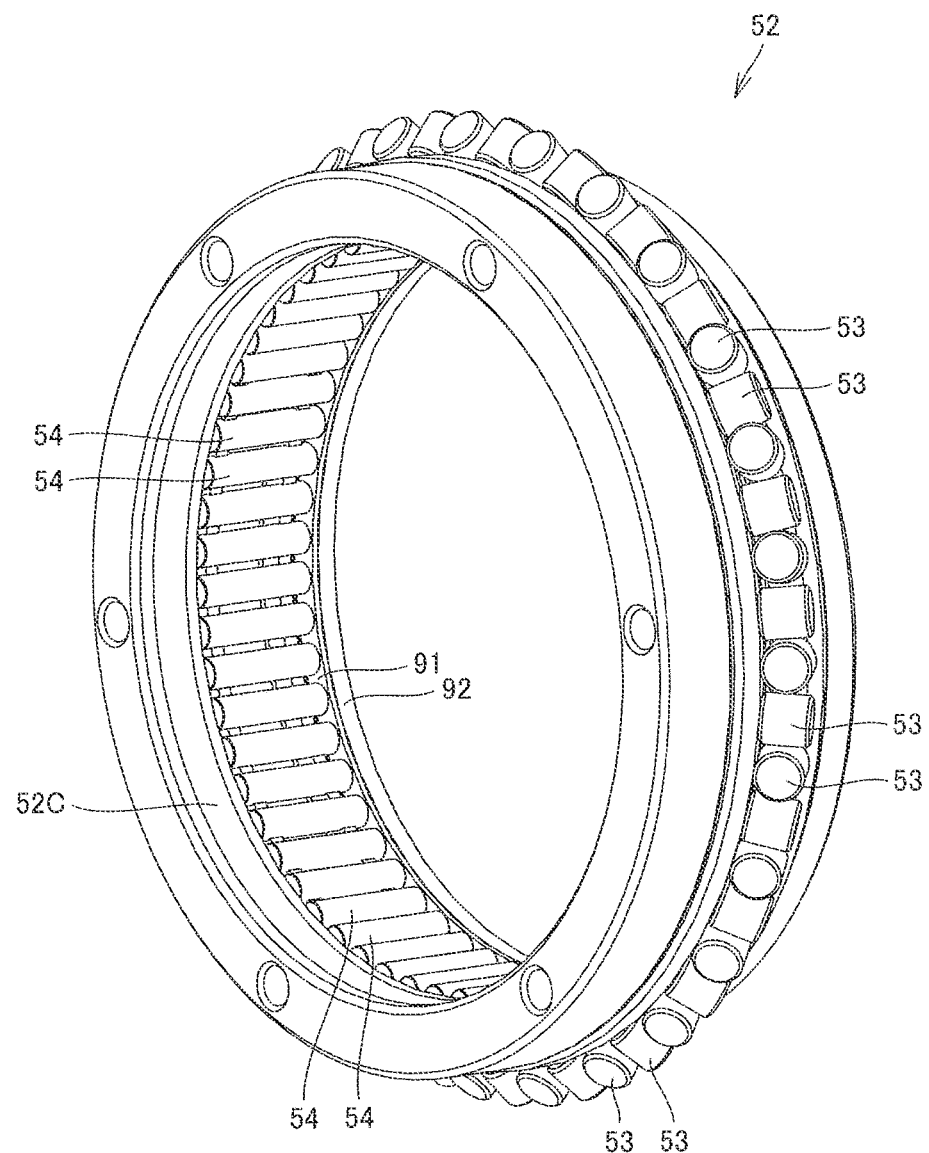
FIG. 11 is a perspective view illustrating a state where rollers and internal tooth pins are arranged in an output shaft.
Figure 12:
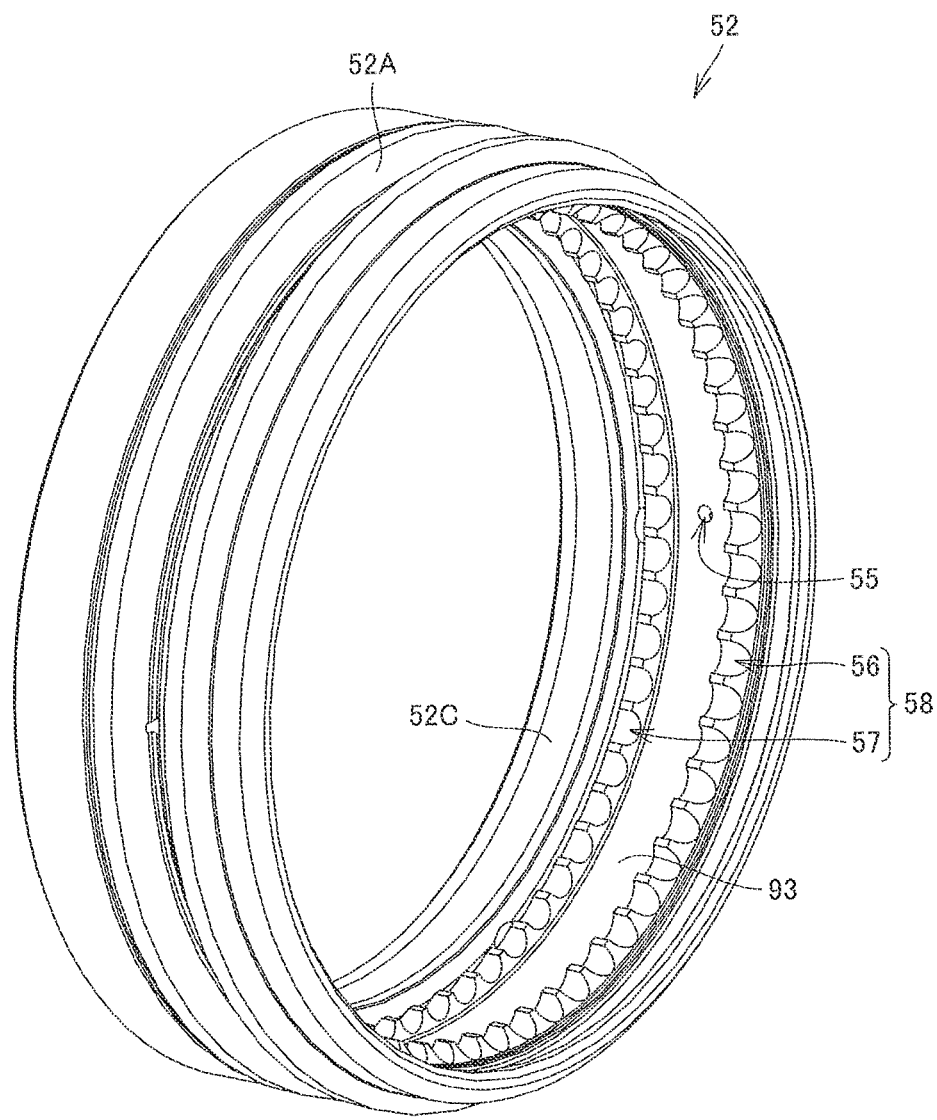
FIG. 12 is a perspective view illustrating a state where the rollers and the internal tooth pins are omitted in the output shaft.
Figure 13:
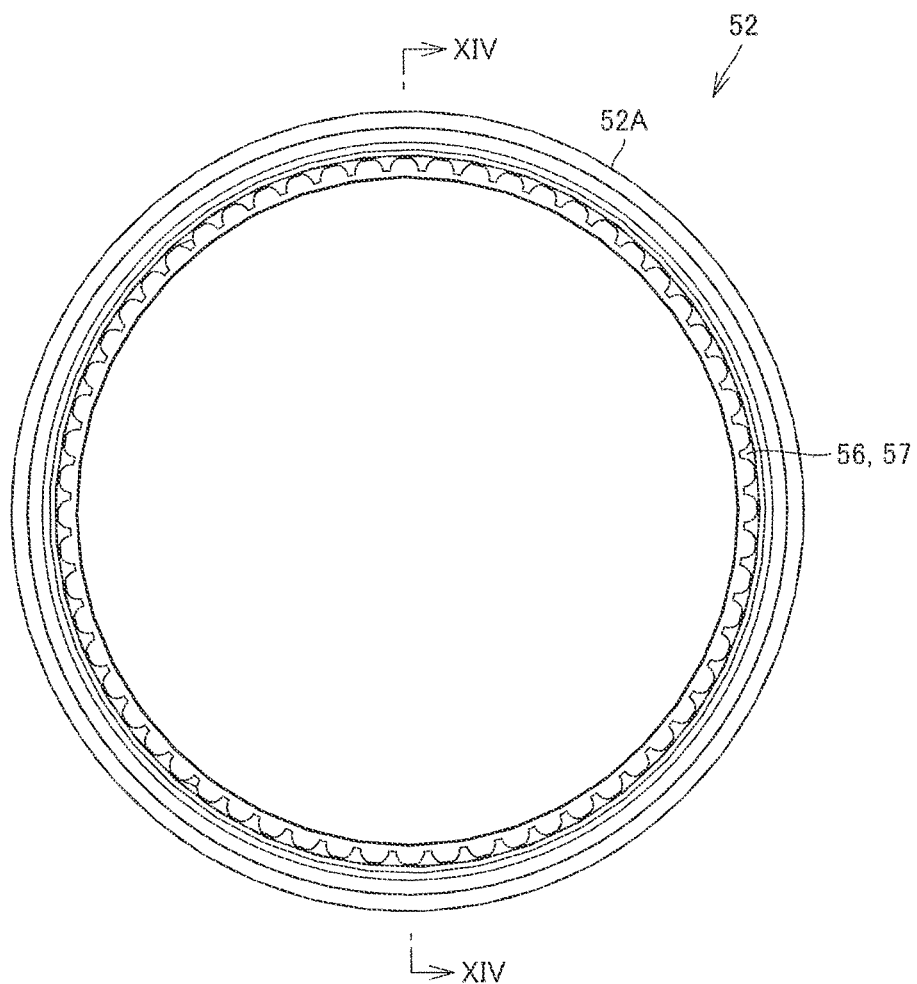
FIG. 13 is a plan view illustrating a configuration of the output shaft.
Figure 14:
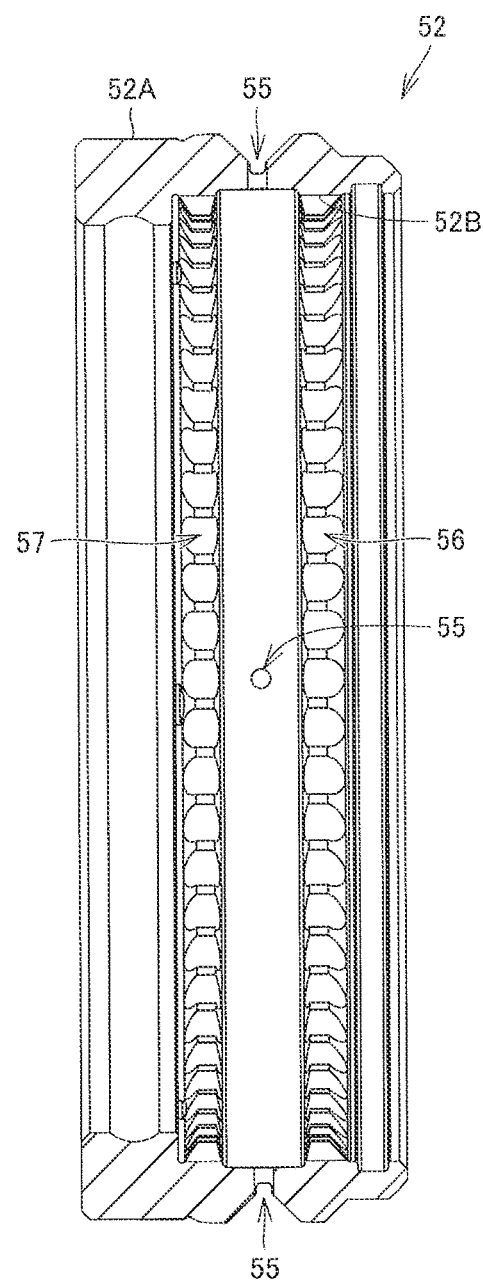
FIG. 14 is a cross-sectional view taken along line XIV-XIV in FIG. 13.

FIG. 11 is a perspective view illustrating a state where the rollers 53 are arranged on the outer circumferential surface of the inner ring 52 and the internal tooth pins 54 are arranged on the inner circumferential surface of the inner ring 52. FIG. 12 is a perspective view illustrating the inner ring 52 in a state where the rollers 53 and the internal tooth pins 54 are omitted. FIG. 13 is a plan view of the inner ring 52. FIG. 14 is a cross-sectional view taken along line XIV-XIV in FIG. 13.

As illustrated in FIG. 11, the rollers 53 (cylindrical rollers) are arranged on the entire outer circumferential surface of the inner ring 52 in the circumferential directions. Here, rolling axes of two rollers 53 adjacent to each other in the circumferential directions are orthogonal to each other. The internal tooth pins 54 are arranged on the entire inner circumferential surface of the inner ring 52 in the circumferential directions. Each of the internal tooth pins 54 has a columnar shape and has its longitudinal directions coincide with the axial directions of the inner ring 52. The internal tooth pins 54 mesh with the outer teeth 24 (FIG. 7) of the first external gear 20 and the second external gear 21. Although not particularly limited, the number of the internal tooth pins 54 is larger than the number of the outer teeth 24 (FIG. 7) by one at maximum.

As illustrated in FIG. 12, a pin holding portion 58 for holding the internal tooth pins 54 (FIG. 11) is formed along the inner circumferential surface of the inner ring 52. The pin holding portion 58 includes a first annular portion 56, and a second annular portion 57 separated from the first annular portion 56 in the axial directions D1. Each of the first annular portion 56 and the second annular portion 57 is made of grooves consecutively formed on the entire circumferential directions. First ends of the internal tooth pins 54 (FIG. 11) are fitted in the grooves of the first annular portion 56, and second ends (ends opposite to the first ends in the axial directions D1) of the internal tooth pins 54 are fitted in the grooves of the second annular portion 57. As illustrated in FIG. 13, the grooves of the first annular portion 56 and the second annular portion 57 are grooves having arc shapes in plan view seen in the axial directions D1.

With reference to FIG. 4, the speed reducer 1 includes an annular pin guide plate 91 and a retaining ring 92. The pin guide plate 91 and the retaining ring 92 are attached to a portion of the inner circumferential surface of the inner ring 52 located outward of the holding portions of the internal tooth pins 54 in the axial directions D1. As illustrated in FIG. 4, the pin guide plate 91 faces the first ends (ends toward the first holder portion 41) of the internal tooth pins 54 in the axial directions D1. The retaining ring 92 is located at the opposite side to the internal tooth pins 54 when seen from the pin guide plate 91, and faces the pin guide plate 91 in the axial directions D1. The pin guide plate 91 is made of, but not limited to, a metal plate, for example.

In assembly of the speed reducer 1, the internal tooth pins 54 are sequentially inserted in the grooves of the first annular portion 56 and the grooves of the second annular portion 57 in the axial directions D1 in this order (FIGS. 11 and 12). Thereafter, the pin guide plate 91 and the retaining ring 92 are attached to the inner circumferential surface of the inner ring 52. Accordingly, movement of the internal tooth pins 54 toward the first holder portion 41 in the axial directions D1 is restricted. The internal tooth pins 54 rotate about the axis by contact with the outer teeth 24 of the first external gear 20 and the second external gear 21.

The inner ring 52 has oil supply holes 55 penetrating the inner ring 52 in the radial directions from the outer circumferential surface 52A to the inner circumferential surface 52B. As illustrated in FIG. 14, the plurality of (four in this embodiment) oil supply holes 55 are formed at intervals circumferentially. Lubricating oil flows through the oil supply holes 55 from the outer circumferential surface 52A toward the inner circumferential surface 52B of the inner ring 52.

As illustrated in FIG. 4, the outer circumferential surface 52A of the inner ring 52 has a groove such that the distance between raceway surfaces 52AA and 52AB gradually increases in a direction away from the bottom in a cross section including the rotation axis R1. The oil supply holes 55 are formed in the bottom of this groove. One raceway surface 52AA has its diameter gradually decrease from the first end 10A toward the second end 10B of the input shaft 10 in a cross section (cross section of FIG. 4) including the rotation axis R1. The other raceway surface 52AB has its diameter gradually decrease from the second end 10B toward the first end 10A. The raceway surfaces 52AA and 52AB are surfaces on which the rollers 53 roll.

The oil supply holes 55 are open to an oil groove 93. As illustrated in FIG. 12, the oil groove 93 is an annular region between the first annular portion 56 and the second annular portion 57. The oil supply holes 55 enable a lubricant such as grease supplied from the outside of the outer ring 51 to reach the inside of the speed reducer 1.

Next, operation of the speed reducer 1 according to the first embodiment will be described.

First, when the motor (not shown) is driven, the input shaft 10 rotates at high speed. Accordingly, the centers of the first external gear 20 and the second external gear 21 rotate (revolve) about the center of the input shaft 10, and the outer teeth 24 (FIG. 7) of the first external gear 20 and the second external gear 21 are brought into contact with the internal tooth pins 54. At this time, although the first external gear 20 and the second external gear 21 swing at the inner side of the inner ring 52, but since the inner pin holder 40 is fixed to the outer ring 51, the first external gear 20 and the second external gear 21 do not rotate. The outer rings 62 (FIG. 8) of the inner pins 60 rotate by contact with the inner surfaces of the second through holes 23 of the first external gear 20 and the second external gear 21.

On the other hand, the internal tooth pins 54 are pushed circumferentially by the outer teeth 24 of the first external gear 20 and the second external gear 21. Consequently, the inner ring 52 holding the inner pin 54 rotate, as the output shaft, about the rotation axis R1 at a speed lower than the input shaft 10. At this time, the direction in which the inner ring 52 rotates is the same as a direction in which the input shaft 10 rotates. The position of the rotation axis of the inner ring 52 coincides with the position of the rotation axis of the input shaft 10.

Thereafter, advantages of the speed reducer 1 according to the first embodiment will be described.

In the speed reducer 1, the internal tooth pins 54 are held at the inner circumferential surface of the inner ring 52 constituting the output shaft. That is, the output shaft serves as an internal gear. Thus, the thickness of the speed reducer in the axial directions D1 can be further reduced, as compared to a conventional speed reducer in which an output shaft and an internal gear are arranged in the axial directions. As a result, the speed reducer 1 according to this embodiment can be made compact in the axial directions D1 as compared to conventional speed reducers.

Second Embodiment

Next, a speed reducer according to a second embodiment will be described. The speed reducer according to the second embodiment has a configuration and advantages basically similar to those of the speed reducer 1 according to the first embodiment, but is different from the speed reducer 1 according to the first embodiment in the configuration of the inner pin lubricating member. Hereinafter, only aspects different from the speed reducer 1 according to the first embodiment will be described.

Figure 15:
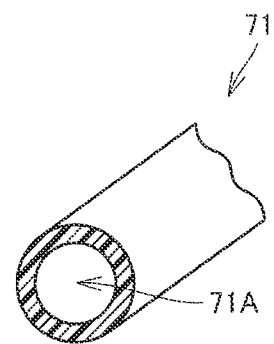
FIG. 15 is a perspective view illustrating a configuration of an inner pin lubricating member in a second embodiment.

FIG. 15 is a perspective view illustrating a configuration of an inner pin lubricating member 71 in this embodiment. As illustrated in FIG. 15, the inner pin lubricating member 71 has a cylindrical shape, and has a hole 71A penetrating the inner pin lubricating member 71 in the axial directions D1. The hole 71A is a circular hole when seen in the axial directions D1, but is not limited to this shape. As a result, the weight can be reduced as compared to a case where the inner pin lubricating member is solid.

Other Embodiments

Other embodiments will now be described.

In the first eccentric bearing 15 and the second eccentric bearing 16, outer rings may be omitted. In this case, the roller 15A of the first eccentric bearing 15 contacts the inner surface of the first through hole 22 of the first external gear 20, and the roller 16A of the second eccentric bearing 16 contacts the inner surface of the first through hole 22 of the second external gear 21.

The driving motor is not necessarily attached to the second end 10B of the input shaft 10, and may be attached to the outer end surface of the second holder portion 42, for example.

In the first external gear 20 and the second external gear 21, the second through holes 23 are not limited to elongated holes, and may be holes of complete circles. The third through holes 25 may be omitted.

The second bearing 50 is not limited to the cloth roller bearing and may be a bearing of another type. In the second bearing 50, the oil supply holes 55 of the inner ring 52 may be omitted.

In the first embodiment, the case where the second holder portion 42 and the columns 43 are integrated is described as an example, but the present disclosure is not limited to this example. The first holder portion 41 and the columns 43 may be integrated. In this case, end surfaces of the columns 43 (surfaces of the columns 43 at a side opposite to the first holder portion 41) are fixed to the second holder portion 42 with fixing members (e.g., bolts) inserted in the columns 43 from these end surfaces.

It should be understood that the embodiments disclosed here are illustrative and non-restrictive in every respect. The scope of the present invention is defined by the terms of the claims, rather than the description above, and is intended to include any modifications within the scope and meaning equivalent to the terms of the claims.

DESCRIPTION OF REFERENCE NUMERALS 1 speed reducer, 10 input shaft, 10A first end, 10B second end, 10C shoulder, 11 first shaft portion, 11A keyway, 12 second shaft portion, 13 key, 14 first support bearing, 15 first eccentric bearing (first bearing), 15A roller, 15B cage, 16 second eccentric bearing (first bearing), 16A roller, 16B cage, 17 second support bearing, 20 first external gear, 21 second external gear, 22 first through hole, 23 second through hole, 24 outer teeth, 25 third through hole, 30 lid member, 31 pin, 32 grease nipple, 40 inner pin holding portion, 40A internal screw hole, 40B end surface, 41 first holder portion, 41A bolt hole, 42 second holder portion, 43 column, 50 second bearing, 51 outer ring, 51A inner circumferential surface, 51B insertion hole, 52 inner ring, 52A outer circumferential surface, 52AA, 52AB side wall, 52B inner circumferential surface, 52C recessed groove, 52D outer end surface, 53 roller, 54 internal tooth pin, 55 oil supply hole, 56 first annular portion, 57 second annular portion, 58 pin holding portion, 59 seal, 60 inner pin, 61 shaft, 62 outer ring, 63 roller, 64 thrust washer, 70, 71 inner pin lubricating member, 71A hole, 90 seal, 91 pin guide plate, 92 retaining ring, 93 oil groove, 94 seal, B1, B2 bolt, D1 axial direction, D2 radial direction, R1 rotation axis.

The invention claimed is:

1. A speed reducer comprising:
a ring-shaped external gear including a plurality of outer teeth and having a first through hole and a plurality of second through holes, the outer teeth being arranged on an outer circumferential surface of the external gear along circumferential directions, the first through hole penetrating the external gear in axial directions, the second through holes being arranged in the circumferential directions to surround the first through hole;
an input shaft penetrating the first through hole and rotatable about a rotation axis;
a first bearing disposed between the external gear and the input shaft and holding the input shaft such that the input shaft is rotatable relative to the external gear in the circumferential directions;
a plurality of inner pins penetrating the second through holes in the axial directions;
an inner pin holder holding both ends of the inner pins and surrounding an outer circumferential surface of the input shaft;
a second bearing surrounding the outer circumferential surface of the external gear; and
internal tooth pins meshing with the outer teeth, wherein the second bearing includes
an outer ring fixed to the inner pin holder,
an inner ring disposed inward of the outer ring in radial directions and constituting an output shaft that rotates at a speed lower than the input shaft, and
a roller that contacts an inner circumferential surface of the outer ring and an outer circumferential surface of the inner ring, and
the inner ring includes a pin holding portion having a ring shape surrounding the outer circumferential surface of the external gear, the pin holding portion holding the internal tooth pin and extending along an inner circumferential surface of the inner ring.

2. The speed reducer according to claim 1, wherein the inner ring has an oil supply hole penetrating the inner ring in the radial directions.

3. The speed reducer according to claim 2, wherein
the outer circumferential surface of the inner ring has a groove such that a distance between raceway surfaces gradually increases in a direction away from a bottom of the groove in a cross section including the rotation axis, and the oil supply hole is disposed at the bottom of the groove.

4. The speed reducer according to claim 1, wherein
the inner pin holder includes
a first holder portion including a ring-shaped holding portion that holds first ends of the inner pins,
a second holder portion including a ring-shaped holding portion that holds second ends of the inner pins at a side opposite to the first ends, and
columns connecting the first holder portion and the second holder portion to each other, being arranged at intervals in the circumferential directions, and penetrating the second through holes, and the speed reducer further comprises a fixing member that fixes end surfaces of the columns to the first holder portion or the second holder portion and is inserted in the columns from the end surfaces.

5. The speed reducer according to claim 4, wherein
a cross-sectional shape perpendicular to a longitudinal direction of each of the columns is an arc shape extending in the circumferential directions, and
the second through holes are elongated holes each extending in the circumferential directions.

6. The speed reducer according to claim 4, wherein
each two of the inner pins sandwich a corresponding one of the columns in the circumferential directions, and
the inner pins are rolling bearings or plain bearings.

7. The speed reducer according to claim 1, further comprising a lubricating member disposed inward of the second through holes and contacting the inner pins.

8. The speed reducer according to claim 7, wherein the lubricating member includes a hole penetrating the lubricating member in the axial directions.

* * * * *